Patented Aug. 8, 1933

1,921,292

UNITED STATES PATENT OFFICE 1,921,292

COMPOSITION AND METHOD OF MAKING AND USING THE SAME

Mortimer T. Harvey, East Orange, N. J.

No Drawing. Application November 28, 1928
Serial No. 322,575

7 Claims. (Cl. 134—26)

The present invention relates to products of reactions between cashew nut shell liquid and hexamethylenetetramine with or without other materials, and to methods, process, and steps for producing the reactions; and the invention also relates to materials made from the reaction products. The products of reaction of this invention are useful in making paints, varnishes, electrical insulation, coatings, molded compositions, and are useful in the arts generally.

Hexamethylenetetramine dissolves in cashew nut shell liquid, the rate of entering into solution being hastened by the application of heat. When desired the two materials can be run through a mixer or ground together in a ball mill to get a thorough and uniform intermixture, with or without the application of heat.

Hereinafter in this specification cashew nut shell liquid will be referred to as Cnsl and hexamethylenetetramine as hexamine.

The Cnsl used can be raw and unheated, or it can be preheated, as, for example, in the open or in a closed container. The preheating speeds the rate of reaction with the hexamine. A suitable temperature of preheating in any of the above cases is, for example, above 500° F., say about 600° F., but other temperature, higher and lower, can be used to suit conditions and rate of reaction. Usually the Cnsl, when preheated, is cooled or allowed to cool before the hexamine is added, because the Cnsl and hexamine react at a rapid rate at elevated temperatures.

The products of reactions of Cnsl and hexamine can be made to go through various states of consistency from the liquid, through a plastic or rubbery state, and to a solid state; and the reaction products can be used and applied in any of these states. The firmer or harder states are obtained by the application of heat or by the aid of driers or catalyzers, or with the latter and heat. The reaction can be retarded and can even be arrested by regulating or controlling, discontinuing, or omitting the heating, and the same heat control can be practised when driers or catalysts are used. And products can be made which will remain at an intermediate state for long or indeterminate periods at normal temperature. The amount of hexamine is also regulated to control the rate of reaction of the reaction products; the greater the amount of hexamine used, the quicker is the setting. As is well known in the production of chemical reactions with the aid of heat, the length of time and temperature to which the Cnsl and hexamine are heated are regulated and controlled to suit the mass or quantity of these agents because larger bodies retain heat for a longer period after the source of heat is removed than do smaller bodies.

As an example of steps in obtaining a liquid for dipping or coating the following is given. A quantity of the Cnsl of commerce is brought up to a temperature of 600° F. and then permitted to cool. A mixture of one hundred parts by weight of this heat treated Cnsl and three parts of hexamine are raised to a temperature of about 265° F. and then allowed to cool. This latter temperature is suitable for small batches, for larger batches lower temperatures would need to be used depending on the rate of cooling after the heating. The reaction product is a liquid at normal temperatures. Dippings and coatings made of this liquid product when set at a temperature of 285° F. give a film which is water and moisture proof, is resistant to petroleum solvents, to acids and alkalis, and has a comparatively high dielectric value. This material, before setting, can be taken up and applied with a solvent such as gasoline, Varnoline, benzol. The drying or setting time, when a solvent is used, is longer than when none is used.

When five parts by weight of hexamine are mixed with one hundred parts of Cnsl, preheated as described in the preceding paragraph, and raised to a temperature of about 265° F., more or less, to suit the volume of material used, a reaction product is obtained which will set to a film in about twenty minutes at about 285° F. This same material can be used as a coating on the marginal portions of sheet metal to serve as seals for seams in containers made up, from the sheet metal. And the unset material can be poured into the annular channels in a common and well known form of metal cover for glass and other containers and set therein to a resilient, rubbery consistency by heating, for example, at about 200° F. for about two to three hours. This product will maintain its resiliency indefinitely and is resistant to the action of solvents and chemicals as named in the preceding paragraph.

The above examples are given merely as such and are not to be considered as limiting the use and application of the methods and products of the invention because variations in percentages of the Cnsl and hexamine, in the time and temperatures of the different heating steps and in the sequences these steps, and in the mode of application and use of the products of reaction can be made by one skilled in the art to suit different needs.

The products of the invention in various states, from the state in which the Cnsl and hexamine are merely mixed or dissolved together, through the intermediate stages and including the resilient or rubbery state, are useful for mixing with rubber to impart to rubber the characteristics of resistance to solvents, chemicals, brine solutions, and so on and to increase the life of rubber. And, as can be seen from the examples of use in can seams and cover seals, the products of the invention alone are useful as rubber substitutes and for use in place of rubber and in some places where rubber cannot be used.

The products of the invention are useful for incorporation in varnishes of other ingredients, including Cnsl varnish, linseed oil, tung oil and other varnishes.

The products of the invention are useful in making both hot and cold molded compositions, particularly in the solid state, which latter is obtained by increasing the length of time and/or temperature of one or more of the heating steps or otherwise varying the heating to suit different needs. Fillers can be mixed with the products of the invention in a liquid state or in a plastic state preparatory to forming molded composition; also a primary solid or presolid product can be comminuted and mixed with a filler or filler and binder, such as product in the liquid or plastic state or other binder, and the material pressed and heated to complete the reaction for producing a final solid product.

In any or all of the products of the invention, such as those hereinbefore cited, driers and/or accelerators can be used to speed up the rate of setting. Such materials can be litharge, red lead, copper oleate, manganese resinate, and particularly in the advanced stages of the product, such as in molded composition, lime, barytes and so on can be used both as filler and accelerator. Sulphur also can be used in the various products of the invention to react with the Cnsl and to modify the reaction products.

An example of a method for making and applying an impregnating compound for electric coils is now given. Commercial Cnsl is brought up to a temperature of about 600° F. and then permitted to cool, and as it cools, about one per cent of manganese resinate is added at 450° F. When the liquid reaches room temperature about three per cent of hexamine is added and the mixture is heated to 195° F. to dissolve the hexamine. Coils to be impregnated are heated for about two hours at about 225° F., and then placed in an autoclave and the air withdrawn therefrom, the suction being held for about one-half hour after maximum vacuum is obtained. The above prepared impregnating liquid is then charged into the autoclave without breaking the vacuum and the vacuum held for another half hour after charging with the impregnating liquid. From the time the liquid is charged into the autoclave the temperature therein is raised above room temperature to make the impregnating liquid thin but is kept below 160° F. so that said liquid does not set prematurely. The temperature used on a coil with paper between layers was kept around 125° F. At the end of the second half-hour period, that is one-half hour after the impregnating liquid is charged into the autoclave, the vacuum is released and pressure is applied of about 60 to 80 pounds for about one-half hour, to drive the liquid into the coils, the temperature being unchanged. At the end of this period the coils are removed from the autoclave drained, and are baked in an oven at about 225° F. for about twelve hours to set the impregnating liquid. At the exposed surfaces the said liquid has a comparatively hard, smooth film, and inside the surface the impregnating liquid has set into a firm, binding mass. No solvent or vehicle was used for this impregnation, but when desired as in cases for dipping cloth or paper, for example, a vehicle can be used, pertoleum spirits such as gasoline, Varnoline and so on being suitable.

Another example for making coating, dipping, or impregnating material is now given. Two parts of commercial Cnsl and one part of stearine pitch are mixed and heated together to about 600° F. and allowed to cool and as it cools hexamine, about two per cent of the whole, is added at 265° F., care being taken to cool the mass at a rate sufficient to retard setting reaction. With different size batches, the hexamine is added at different temperature, to suit the rate at which the mass can be cooled. A vehicle, Varnoline, is added at about 140° F.

Coatings of this material on paper and cloth dry to a smooth, flexible, and strong film in twenty minutes at about 285° F. For some purposes, such as for impregnations, the vehicle is omitted; and the hexamine is not added until the Csnl-stearine pitch mixture has reached a lower temperature than that given above, for example, at 195° F., this for the purpose of slowing down or delaying the setting of the material and keeping it at an optimum state of fluidity until it has been forced into the material and structure to be impregnated.

To suit different conditions and purposes, changes can be made in any of the examples above given, whether generally referred to or particularly described, by adding various materials as loaders or fillers or to secure certain modifications, within the skill of one having knowledge of the art and without departing from the scope of the present invention. Such materials are gums; resins; vegetable, mineral, and animal pitches; drying oils such as linseed oil, Chinawood oil, fish oil, and so on.

For some purposes it is convenient to commence the reaction of cashew nut shell liquid and hexamethylenetetramine in a solvent for the intermediate reaction products thereof and hold the latter in said solvent and apply it therewith, after which the solvent is driven off and the reaction completed to a predetermined or desired degree to set the reaction product.

For some purposes the Cnsl either raw or preheated, can be thickened with formaldehyde by reacting these two materials together either alone or in a vehicle such as Varnoline, and then reacted with hexamethylenetetramine, in said solvent when the same is used or without a solvent or in a solvent added after the Cnsl-formaldehyde reaction has been made. Cnsl-formaldehyde compositions can be made to set faster when hexamethylenetetramine is used than without. This method is useful in making various kind of products such as coating materials, gummy can seals, hot and cold molded compositions and for use in the arts generally.

Having thus described my invention, what I claim is:

1. Composition of matter obtained by heating together cashew nut shell liquid, stearine pitch, and hexamethylenetetramine.

2. Composition of matter obtained by heating together cashew nut shell liquid, stearine pitch, hexamethylenetetramine and a drier.

3. A method of making a composition of matter which is adapted for use by itself and also adapted to be taken up with a vehicle, and is adapted for setting after application by heating, which comprises heating together to about 600° F. about two parts by weight of cashew nut shell liquid and one part of stearine pitch, cooling and adding hexamethylenetetramine, about two per cent of the whole, at about 265° F., as the mass cools.

4. The method which comprises reacting cashew nut shell liquid and hexamethylenetetramine to an intermediate reaction product and arresting the reaction by keeping at a temperature not over about 140° F. until time to produce further reaction.

5. The method which comprises heating cashew nut shell liquid to increase its rate of reaction with hexamethylenetetramine, reacting with hexamethylenetetramine and maintaining at a temperature not over about 140° F. to arrest reaction until used.

6. The method which comprises heating cashew nut shell liquid above about 500° F. to increase its rate of reaction with hexamethylenetetramine, reacting with hexamethylenetetramine, and maintaining at a temperature not over about 140° F. until used.

7. The method which comprises preheating cashew nut shell liquid to increase its rate of reaction with hexamethylenetetramine, reacting with hexamethylenetetramine at a temperature above normal, and, when over 140° F., cooling to a temperature not over 140° F. before setting takes place.

MORTIMER T. HARVEY.